US010771985B2

(12) United States Patent
Zhang et al.

(10) Patent No.: US 10,771,985 B2
(45) Date of Patent: Sep. 8, 2020

(54) METHODS AND APPARATUS FOR MULTIPLE CONNECTIVITY IN HETEROGENEOUS NETWORK

(71) Applicant: MEDIATEK Singapore Pte. Ltd., Singapore (SG)

(72) Inventors: Yuanyuan Zhang, Beijing (CN); Yu-Syuan Jheng, Taipei (TW); Aimin Justin Sang, San Diego, CA (US)

(73) Assignee: HFI Innovation INC., Hsin-Chu (TW)

( * ) Notice: Subject to any disclaimer, the term of this patent is extended or adjusted under 35 U.S.C. 154(b) by 237 days.

(21) Appl. No.: 15/681,761

(22) Filed: Aug. 21, 2017

(65) Prior Publication Data
US 2017/0347277 A1 Nov. 30, 2017

Related U.S. Application Data

(63) Continuation of application No. PCT/CN2016/079501, filed on Apr. 15, 2016.

(30) Foreign Application Priority Data

Apr. 17, 2015 (WO) ................ PCT/CN2015/076877

(51) Int. Cl.
*H04W 16/32* (2009.01)
*H04W 76/15* (2018.01)
(Continued)

(52) U.S. Cl.
CPC ........... *H04W 16/32* (2013.01); *H04W 76/15* (2018.02); *H04W 84/045* (2013.01); *H04W 92/20* (2013.01)

(58) Field of Classification Search
CPC ............................. H04W 16/32; H04W 76/15
See application file for complete search history.

(56) References Cited

U.S. PATENT DOCUMENTS

2013/0201841 A1* 8/2013 Zhang .................. H04L 1/1607
370/252
2014/0004863 A1 1/2014 Zhang et al. ................. 455/444
(Continued)

FOREIGN PATENT DOCUMENTS

CN 101848546 A 3/2009
CN 102469557 A 11/2010
(Continued)

OTHER PUBLICATIONS

International Search Report and Written Opinion of International Search Authority for PCT/CN2016/079501 dated Jul. 13, 2016 (11 pages).

(Continued)

*Primary Examiner* — Hoon J Chung
(74) *Attorney, Agent, or Firm* — Imperium Patent Works; Helen Mao

(57) ABSTRACT

Methods are provided to perform multiple-connectivity operation in the heterogeneous network. In one novel aspect, multiple-connectivity is configured with one microwave macro cell and multiple small cells. UE establishes control plane connectivity with the microwave macro cell, where the S1-MME interface is terminated. Multiple small-cell base stations provide traffic data together to the UE and are connected with Xn interfaces. One small-cell base station in the set of the configured small base stations is an UP anchor small-cell base station, where S1-U interface is terminated. Other small base stations are UP assistance small base station. In one embodiment, the set of small base stations and the UP anchor small base stations can be changed based on the measurement report/results of the different cells as well as the cell loading status. The anchor base station can be changed either by the UE or through network configuration.

18 Claims, 8 Drawing Sheets

(51) Int. Cl.
  *H04W 92/20* (2009.01)
  *H04W 84/04* (2009.01)

(56) References Cited

U.S. PATENT DOCUMENTS

| | | | |
|---|---|---|---|
| 2014/0086176 A1 | 3/2014 | Liu et al. | 370/329 |
| 2014/0171054 A1 | 6/2014 | Cai et al. | 455/418 |
| 2014/0355562 A1* | 12/2014 | Gao | H04B 7/02 370/331 |
| 2015/0029999 A1* | 1/2015 | Horn | H04W 36/22 370/331 |
| 2015/0156802 A1 | 6/2015 | Morioka et al. | 370/328 |
| 2015/0351135 A1* | 12/2015 | Schmidt | H04W 76/10 455/450 |
| 2015/0358832 A1 | 12/2015 | Morioka et al. | 370/254 |
| 2015/0365822 A1 | 12/2015 | Sharma | 455/410 |
| 2015/0382364 A1 | 12/2015 | Sharma | 370/329 |
| 2016/0050657 A1 | 2/2016 | Kishiyama et al. | 370/329 |
| 2016/0113052 A1* | 4/2016 | Worrall | H04W 12/0403 455/450 |

FOREIGN PATENT DOCUMENTS

| | | |
|---|---|---|
| CN | 104429157 A | 7/2012 |
| EP | 2871913 A1 | 7/2012 |
| EP | 2945458 A1 | 1/2013 |
| EP | 2983431 A | 4/2013 |
| EP | 2804413 A | 5/2013 |
| WO | WO2014006982 A1 | 7/2012 |
| WO | WO2014109082 A1 | 1/2013 |
| WO | WO2014112262 A1 | 1/2013 |
| WO | WO2014163045 A1 | 4/2013 |
| WO | WO2014168226 A1 | 4/2013 |

OTHER PUBLICATIONS

EPO, search report for the EP patent application 16779636.6 dated May 29, 2018 (11 pages).

Richard J. Weiler et al., "Split control plane functionality in millimeter-wave overlay access", 2014 1st International Conference on 5G for Ubiquitous Connectivity (5GU), *pp. 134-139*.

Sipo, office action for the CN patent application 201680003738.0 (no English translation is available) dated Apr. 7, 2020 (7 pages).

* cited by examiner

METHODS AND APPARATUS FOR MULTIPLE CONNECTIVITY IN HETEROGENEOUS NETWORK

CROSS REFERENCE TO RELATED APPLICATIONS

This application is filed under 35 U.S.C. § 111(a) and is based on and hereby claims priority under 35 U.S.C. § 120 and § 365(c) from International Application No. PCT/CN2016/079501, with an international filing date of Apr. 15, 2016, which in turn claims priority from International Application No. PCT/CN2015/076877, entitled "Multiple Connectivity in Millimeter Wave System" filed on Apr. 17, 2015. This application is a continuation of International Application No. PCT/CN2016/079501, which claims priority from International Application No. PCT/CN2015/076877. International Application No. PCT/CN2016/079501 is pending as of the filing date of this application, and the United States is a designated state in International Application No. PCT/CN2016/079501. This application claims priority under 35 U.S.C. § 120 and § 365(c) from International Application Number PCT/2015/076877 filed on Apr. 17, 2015. The disclosure of each of the foregoing documents is incorporated herein by reference.

TECHNICAL FIELD

The disclosed embodiments relate generally to wireless communication, and, more particularly, to methods and apparatus for multiple connectivity in heterogeneous network.

BACKGROUND

The bandwidth shortage increasingly experienced by mobile carriers has motivated the exploration of the under-utilized millimeter wave (mmW) frequency spectrum between 6G and 300G Hz for the next generation broadband cellular communication networks. The available spectrum of mmW band is two hundred times greater than the conventional cellular system. The mmW wireless network uses directional communications with narrow beams and can support multi-gigabit data rate. The underutilized bandwidth of the mmW spectrum has wavelengths ranging from 1 mm to 100 mm. The very small wavelengths of the mmW spectrum enable large number of miniaturized antennas to be placed in a small area. Such miniaturized antenna system can produce high beamforming gains through electrically steerable arrays generating directional transmissions.

With recent advances in mmW semiconductor circuitry, mmW wireless system has become a promising solution for the real implementation. The main characteristics of MMW are short wavelength/high frequency, large bandwidth, high interaction with atmospheric constituents and high attenuation through most solid materials. This leads to a sparse-scattering environment and noise-limited system. Beamforming is the key to compensate channel attenuation and reduce interference in MMW networks. However, the heavy reliance on directional transmissions and the vulnerability of the propagation environment present particular challenges for the MMW network. For example, the MMW channel changes much faster than today's cellular system due to the small coherence time, which is about hundreds of microsecond. The MMW communication depends extensively on adaptive beamforming at a scale that far exceeds current cellular system. Further, the high reliance on the directional transmission introduces new issues for synchronization. Broadcast signals may delay the base station detection during cell searching for initial connection setup and for handover because both the base station and the mobile station need to scan over a range of angles before the mobile station can detect the base station. Furthermore, the MMW signals are extremely susceptible to shadowing. The appearance of obstacles, such as human bodies and outdoor materials would cause the signal outage. The small coverage of the MMW cell causes the relative path loss and the cell association to change rapidly. Resolving frequent intermittent connectivity loss and enabling rapid adaptable communication is one of the key features to the development of the MMW wireless network.

Since the MMW bands cannot penetrate obstacles very well and very sensitive to non-light of sight (NLOS) communication and other impairments such as absorption by foliage, rain and other particles in air, the microwave band can improve coverage and ensure seamless user experience in mobile applications. The heterogeneous deployment of both macro cells and MMW small cells can be considered. The macro cell works on the microwave bands used by legacy communication technologies such as E-UTRAN. The deployment is used to overcome the physical limitations of MMW through exploiting both microwave and MMW bands simultaneously and facilitating coexistence of several communication layers with different coverage. Important control messages and signals can be transmitted via the microwave bands to guarantee the transmission reliability.

Improvements and enhancements are required multiple connectivity for the heterogeneous network.

SUMMARY

Methods are provided to perform multiple-connectivity operation in the heterogeneous network. In one novel aspect, multiple-connectivity is configured with one microwave macro cell and multiple small cells. UE establishes a RRC connection with the microwave macro cell, where the S1-MME interface is terminated. The macro cell is responsible for Control-plane (CP) procedure operation. Multiple small-cell base stations provide traffic data together to the UE and are connected with Xn interfaces. Only one small-cell base station in the set of the configured small base stations is an UP anchor small-cell base station, where S1-U interface is terminated. Other small base stations are UP assistance small base station.

In one embodiment, two types of operations are defined for the traffic data transmission/reception with the set of multiple small base stations configured. Only one small base station can transmit/receive traffic data to/from the UE. More than one small base stations can transmit/receive traffic data to/from the UE in parallel.

In another embodiment, different UP protocol stack options of UP anchor small base station, UP assistance small base station and UE are provided in a generic way when multiple small base stations are configured. In one example, the UP anchor small base station forwards the PDCP PDUs to the RLC entity in the UP assistance small base stations. In another example, the UP anchor small base station forwards the RLC PDUs to the MAC entity in the UP assistance small base stations. The different UP protocol stack operations are applicable to both DL and UL data transmission.

In another embodiment, the set of small base stations and the UP anchor small base stations can be changed based on the measurement report/results of the different cells as well as the cell loading status. There are two ways to realize the configuration of the set of small base station as well as the selection of the UP anchor small base station, i.e. network-centric and UE centric. In the network-centric way, UE provides the measurement reports to the network, and the network decides the set of small base stations for multiple-connectivity and informs UE the decision through a configuration message. In the UE-centric way, UE doesn't provides the measurement reports to the network, but decides the set of small base stations for multiple-connectivity itself and informs the network the decision through a configuration message. The network can accept a part of the configuration or reject the configuration carried in the configuration message.

BRIEF DESCRIPTION OF THE DRAWINGS

The accompanying drawings, where like numerals indicate like components, illustrate embodiments of the invention.

DETAILED DESCRIPTION

Reference will now be made in detail to some embodiments of the invention, examples of which are illustrated in the accompanying drawings.

Figure 1:
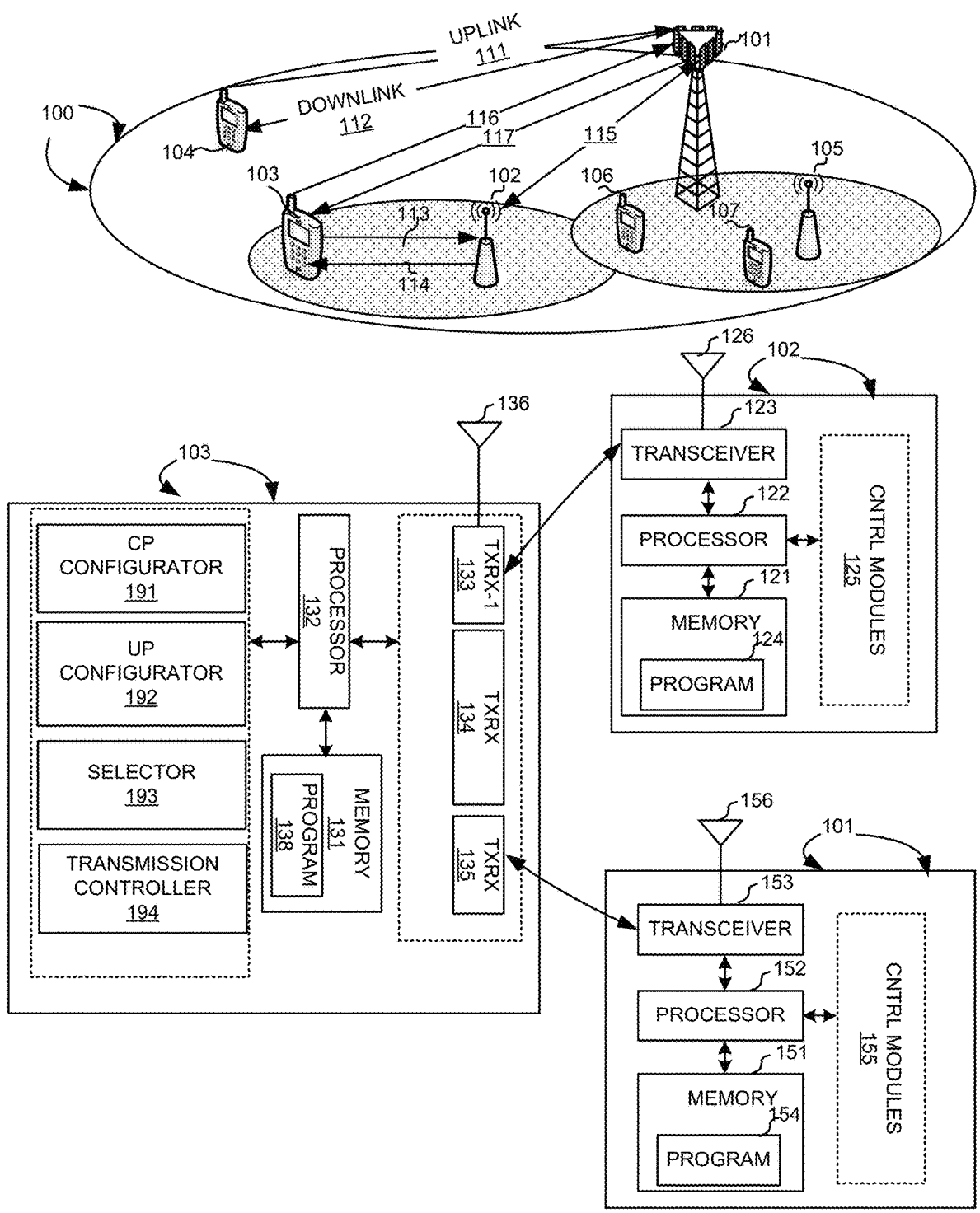
FIG. 1 illustrates an exemplary heterogeneous network in accordance with embodiments of the current invention.

FIG. 1 illustrates an exemplary heterogeneous network 100 in accordance with embodiments of the current invention. Wireless communication system 100 includes one or more fixed base infrastructure units, such as base stations 101 102, and 105, forming a network distributed over a geographical region. The base unit may also be referred to as an access point, an access terminal, a base station, a Node-B, an eNode-B, or by other terminology used in the art. The one or more base stations 101, 102 and 105 serve a number of mobile stations 103, 104, 106 and 107 within a serving area, for example, a cell, or within a cell sector. In particularly, base station 101 operates as a macro-cell base station. Base stations 102 and 105 operate as small cells with different radio access technology (technologies). In one example, two base stations 101 and 102 simultaneously serve the mobile station 103 within their common coverage. A back haul connection 115 connecting the non-co-located base stations 101 and 102 can be either ideal or non-ideal.

Serving base station 101 and 102 transmit downlink communication signals 112, 114, and 117 to mobile stations in the time and/or frequency domain. Mobile station 103 and 104 communicate with one or more base units 101 and 102 via uplink communication signals 111, 113 and 116. In one embodiment, mobile communication network 100 is an OFDM/OFDMA system comprising a base stations eNB 101, mmW base stations 102 and 105, and a plurality of mobile station 103, 104, 106, and 107. When the mobile station, such as mobile station 106, moves in the wireless network, it keeps its control connection to the macro-cell base station, such as base station 101. In one novel aspect, while having the control connection with macro base station 101, a mobile station, such as mobile station 106, may autonomously choose to establish connectivities with different small cell base stations, such as base station 102 and 105. mobile station 106 autonomously initiates access to small cell 102 after control link is established with macro-cell base station 101. When UE 106 autonomously connecting to small-cell base stations, such as base station 102 and 105, it is not triggered by any signaling from the network. Mobile station 106 monitors and analyzes UE status information. It then autonomously initiates the access to the small-cell base station(s). The latency is reduced because there are no additional signaling procedures involved. The UE can react faster.

FIG. 1 further shows simplified block diagrams of base stations 101, 102 and mobile station 103 in accordance with the current invention. Base station 101 has an antenna 156, which transmits and receives radio signals. A RF transceiver module 153, coupled with the antenna, receives RF signals from antenna 156, converts them to baseband signals and sends them to processor 152. RF transceiver 153 also converts received baseband signals from processor 152, converts them to RF signals, and sends out to antenna 156. Processor 152 processes the received baseband signals and invokes different functional modules to perform features in base station 101. Memory 151 stores program instructions and data 154 to control the operations of base station 101. Base station 101 also includes a set of control modules 155 that carry out functional tasks to communicate with mobile stations.

Similarly, base station 102 has an antenna 126, which transmits and receives radio signals. A RF transceiver module 123, coupled with the antenna, receives RF signals from antenna 126, converts them to baseband signals and sends them to processor 122. RF transceiver 123 also converts received baseband signals from processor 122, converts them to RF signals, and sends out to antenna 126. Processor 122 processes the received baseband signals and invokes different functional modules to perform features in base station 102. Memory 121 stores program instructions and data 124 to control the operations of base station 102. Base station 102 also includes a set of control modules 125 that carry out functional tasks to communicate with mobile stations.

Mobile station 103 has an antenna 136, which transmits and receives radio signals. A RF transceiver module 137, coupled with the antenna, receives RF signals from antenna 136, converts them to baseband signals and sends them to processor 132. RF transceiver 137 also converts received baseband signals from processor 132, converts them to RF signals, and sends out to antenna 136. Processor 132 processes the received baseband signals and invokes different functional modules to perform features in mobile station 103. Memory 131 stores program instructions and data 138 to control the operations of mobile station 103. RF Transceiver 137 of mobile station 103 includes two receivers 133 and 135 and one transmitter 134. Receiver 135 receives downlink transmissions from transceiver 153 of base station 101. Receiver 133 receives downlink transmissions from transceiver 123 of base station 102. On the uplink side, there is only one transmitter for mobile station 103, transmitter 134. Transmitter 134 transmits uplink signals to both base stations 101 and 102. In another example, there are two transmitters in mobile station 103, so the mobile station 103 could communicate with base station 101 and 102 with different transmitters.

Mobile station 103 also includes a set of control modules that carry out functional tasks. A CP configurator 191 configures a CP connectivity. A UP configurator 192 configures a set of small-cell base stations to form a UP connectivity, wherein the UP connectivity is different from the CP connectivity. A selector 193 selects one of the small-cell base stations as an UP anchor station and one or more small-cell base stations as UP assistance stations, wherein an S1-U interface from the wireless network is terminated at the selected UP anchor station, and wherein the UP anchor station forwards data traffic packets to the selected one or more UP assistance stations. A transmission controller 194 performs signaling transmission through the configured CP and traffic data transmission/reception through the set of small base stations.

In one novel aspect, the small-cell base stations are MMW base stations and the macro-cell base station is a microwave base station. The specification uses MMW network as an example in describing the small-cell base stations, but not limited to the mmW network.

Figure 2:
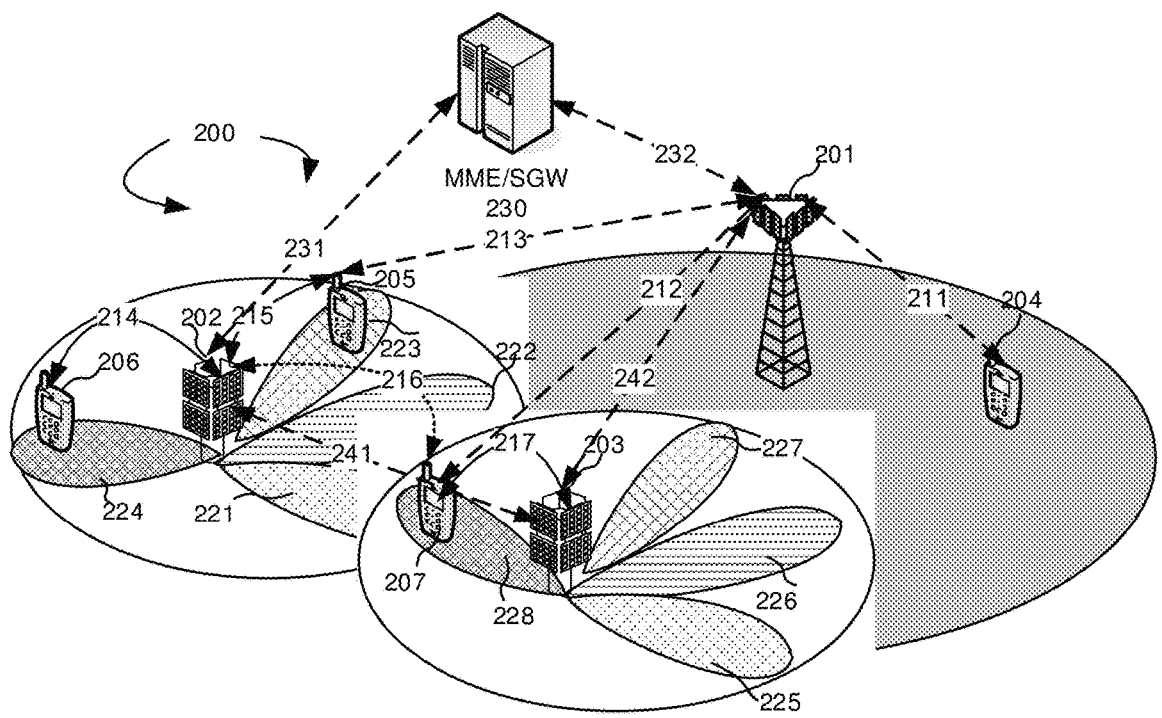
FIG. 2 is a schematic system diagram illustrating an exemplary wireless network with MMW connections in accordance with embodiments of the current invention.

FIG. 2 is a schematic system diagram illustrating an exemplary wireless network 200 with MMW connections in accordance with embodiments of the current invention. Wireless system 200 includes one or more fixed base infrastructure units forming a network distributed over a geographical region. The base unit may also be referred to as an access point, an access terminal, a base station, a Node-B, an eNode-B, or by other terminology used in the art. As an example, base stations 201, 202 and 203 serve a number of mobile stations 204, 205, 206 and 207 within a serving area, for example, a cell, or within a cell sector. In some systems, one or more base stations are coupled to a controller forming an access network that is coupled to one or more core networks. eNB 201 is a microwave base station served as a macro eNB. eNB 202 and eNB 203 are MMW base stations, the serving area of which may or may not overlap with serving area of eNB 201, as well as may or may not overlap with each other. If the serving area of MMW eNB does not overlap the serving area of macro eNB, the MMW eNB is considered as standalone, which can also provide service to users without the assistance of macro eNB. MMW eNB 202 and MMW eNB 203 has multiple sectors each with multiple beams to cover a directional area. Beams 221, 222, 223 and 224 are exemplary beams of eNB 202. Beams 225, 226, 227 and 228 are exemplary beams of eNB 203. As an example, UE or mobile station 204 is only in the service area of eNB 201 and connected with eNB 201 via a link 211. UE 206 is connected with MMW network only, which is covered by beam 224 of eNB 202 and is connected with eNB 202 via a link 214. UE 205 is in the overlapping service area of eNB 201 and eNB 202. In one embodiment, UE 205 is configured with dual connectivities and can be connected with eNB 201 via a link 213 and eNB 202 via a link 215 simultaneously. UE 207 is in the service areas of eNB 201, eNB 202, and eNB 203. In embodiment, UE 207 is configured with multiple-connectivities and can be connected with eNB 201 with a link 212, eNB 203 with a link 217 and eNB 202 with a link 216 with simultaneously data transmission/reception. In embodiment, UE 207 can switch to a link 216 for data transmission/reception to/from eNB 202 upon degradation of the link 217 connecting to eNB 203. eNB 201 connects to the MME/SGW through S1-MME/S1-U interface 232. eNB 202 connects to the MME/SGW through S1-MME/S1-U interface 231. There are also interfaces between different eNBs. For example, eNB 202 connects with eNB 203 with interface 241; eNB 201 connects with eNB 203 with interface 242.

Figure 3:
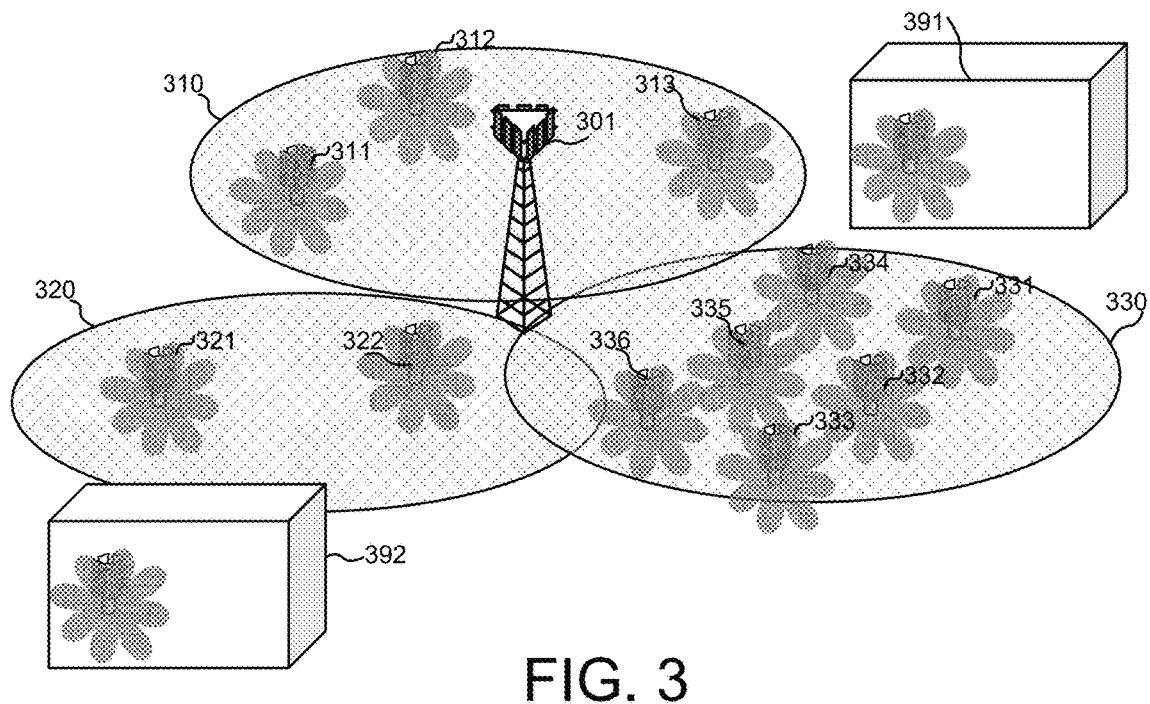
FIG. 3 shows an exemplary wireless system deployment with MMW small cells in accordance with the current invention.

FIG. 3 shows an exemplary wireless system deployment with MMW small cells in accordance with the current invention. In the MMW wireless system deployment, there are two types of heterogeneity in the deployment, including the standalone type and the micro-cell assistance type. In definition of a heterogeneous network, there are two levels of heterogeneities, namely the spectrum heterogeneity and the deployment heterogeneity. For the spectrum heterogeneity, the MMW bands provide a massive amount of bandwidths for data transmission enabling very high data rates; microwave bands are used for control message (such as RRC message) exchange, demanding lower data rates but higher reliability. For the deployment heterogeneity: the microwave bands through omnidirectional transmission/reception provide macro cells; MMW bands through high directional transmission/reception provide small cells. The MMW base station can be either standalone or non-standalone. If the MMW base station is standalone, it is a full-function eNB, which has S1 interface towards the core network and can provide service to users alone. UE can camp on the MMW cell and initiates access to it. FIG. 3 shows two exemplary standalone MMW base stations, 391 and 392.

If the MMW base station is non-standalone, UE can utilize the MMW radio resources only after the RRC connection is established. The integration of MMW band and microwave band can be achieved by different approaches in different layers, including integration in PHY through carrier aggregation, integration in higher layer through dual connectivity (DC), and integration in the core network.

FIG. 3 shows exemplary diagram of the non-stand-alone MMW base stations. Area 310, 320 and 330 are served by multiple MMW base stations. Area 310 includes MMW base stations 311, 312, and 313. Area 320 includes MMW base stations 321 and 322. Area 330 includes MMW base stations 331, 332, 333, 334, 335, and 336. A macro-cell base station 301 assists the non-stand-alone MMW base stations.

In one embodiment of this invention, network integration through DC-like operation is considered assuming that the UE is equipped with multiple TX/RX. The heterogeneous network is called as macro-assisted network, for example, macro-assisted MMW system. "DRB", "data radio bearer" or "bearer" is used to indicate a stream of data packets that are intended to be transferred across the wireless network without changing the order of packets and with certain specific Quality of Service (QoS) characteristics. For example, in the 3GPP LTE access network typically a specific bearer or DRB would be setup for such a stream of data packets, where different streams of packets can be discriminated based on TCP/IP level packet filters. A "split bearer", "split data radio bearer" or "split DRB", is used to indicate a bearer for which where packets are multiplexed onto multiple different radio links that are served by the multiple different network points. E-UTRAN supports Dual Connectivity (DC) operation whereby a multiple RX/TX UE in RRC_CONNECTED mode is configured to utilize radio resources provided by two distinct schedulers, located in two eNBs connected via a non-ideal backhaul over the X2 interface. The current architecture includes UP integration for dual-connectivity. One important design goal in DC is to improve per-user throughput by utilizing radio resources in more than one eNB. Alternative 3C through bearer split is used to achieve the gain close to the technology potential. However, there are prerequisites to the benefit to be achieved, such as the Xn interface is not the bottleneck, is loss-less and causes no re-ordering, offers latency of 5-30 ms. Further, the flow control is used from SeNB towards MeNB and commands are sent frequently. Further, the load in the system is low to medium, users are distributed appropriately (number of UEs served by the macro cell is sufficiently low so that it has resource to allocate to pico UEs), and the SINR difference between different links is small.

For macro-assisted MMW system, the technology potential in terms of per UE throughput is hardly to be achieved through bear split due to the huge difference on bandwidth, channel characteristic, and SINR (interference-limited vs noise-limited between microwave band and MMW band. Considering the extreme high connection density requirement such as millions of connections per square kilometer in 5G, the macro cell is heavily loaded and cannot spare additional resources for throughput enhancement. If bearer splitting is used, it may impair the end-to-end throughput of the UE due to the incomparable throughput provided by the microwave band.

Different from conventional cellular system, the X2 interface between the macro base station and the MMW base station may be a bottleneck, especially when the macro base station connects many MMW base stations with the same backhaul. In this case, congestion on backhaul link may occur, resulting in data loss and out of order transmission.

Furthermore, if bearer split is supported, it is required that the macro base station has even larger buffers and more powerful processors for data storing, processing, reordering and forwarding to match the required data rate on the MMW links.

However, considering the MMW link is intermittent connected due to its vulnerability to propagation environment, it is desirable that the data path through the macro base station is always available in case of the outage of the MMW link. If bearer splitting is used, when the MMW link is in deep shadowing and not available for use, data transmission for the bearer through the microwave link can be continued without involving signaling towards the core network (CN), such as for path switching. With bearer splitting, intermittent connectivity through MMW link is hidden to CN. However, another problem needs to be considered. Due to the huge difference between the achievable throughput between microwave band and MMW band, the end to end UE throughput (TCP throughput) will also degrade sharply even data transmission through macro cell is still on-going.

Figure 4:
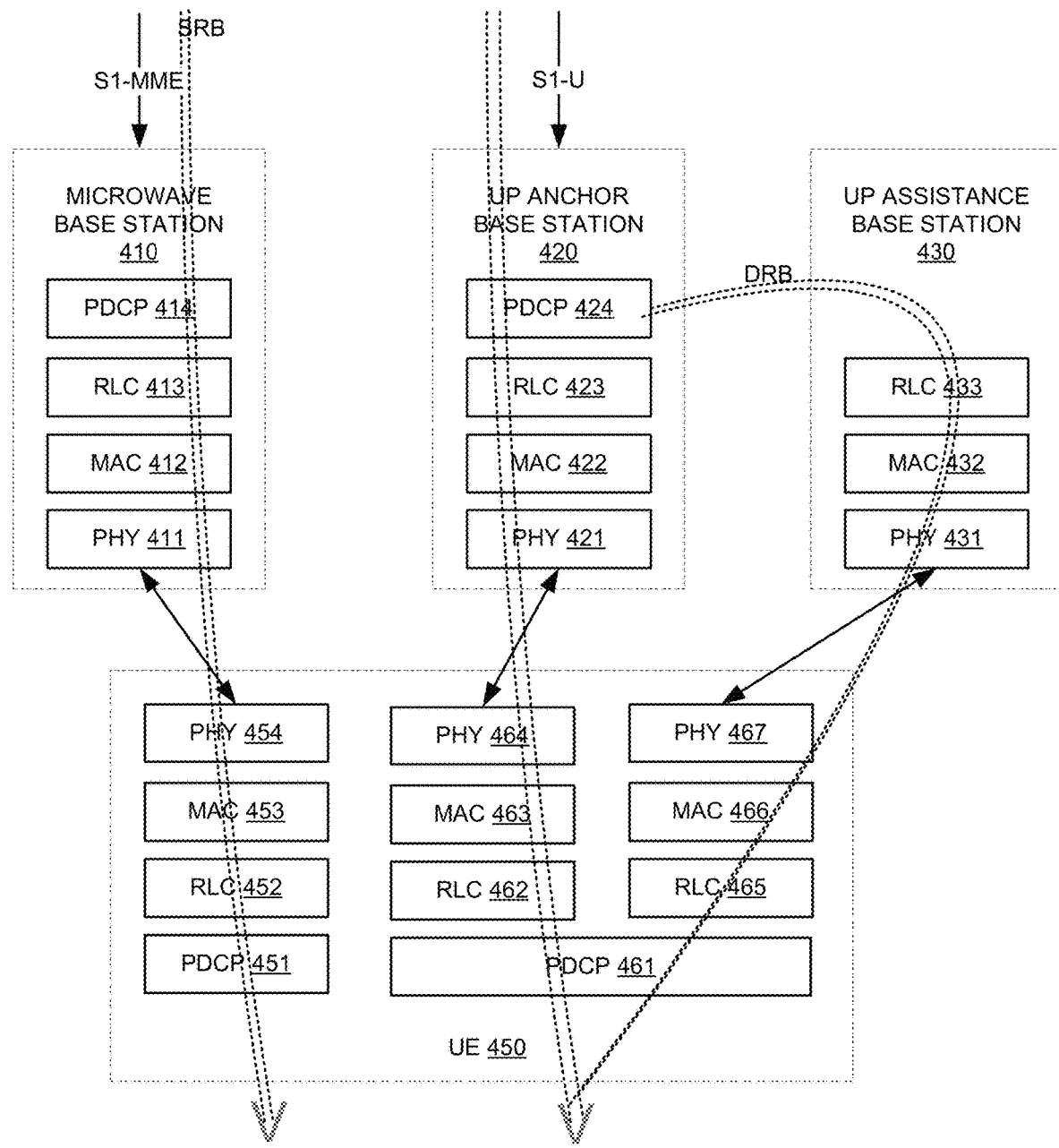
FIG. 4 shows exemplary block diagrams illustrating protocol stacks of the MMW wireless system when multiple-connectivity is configured in accordance with the current invention.

FIG. 4 shows exemplary block diagrams illustrating protocol stacks of the MMW wireless system when multiple-connectivity is configured. The microwave base station provides the coverage of macro cell, and is where S1-MME terminated. The SRBs generated at the RRC layer as well as the NAS message will be delivered through the UP protocol stack of the microwave base station, just as illustrated in dotted line in the left side. The UP anchor MMW base station is where S1-U is terminated. Just as illustrated in dotted line in the middlepart, the PDCP layer of the UP anchor MMW base station will deliver the PDCP PDUs of DRB to the UP assistance MMW base stations. At the UE side, as as illustrated in the dotted line of the right side, the PDCP entity receives PDCP PDUs from two RLF entities corresponding to different MMW base stations and performs reordering if the PDCP PDUs are received out of order. Although the figure is explained from DL perspective, it can also be applied to UL transmission between UE and multiple MMW base stations.

As shown in FIG. 4, UE 450 is configured with CP connectivity with microwave base station 410, with protocol stack of PDCP 414, RLC 413, MAC 412, and PHY 411. UE 450 is also configured with UP connectivity with UP anchor base station 420, with PDCP 424, RLC 423, MAC 422, and PHY 421, and UP assistance base station 430, with RLC 433, MAC 432, and PHY 431. PHY 411 is connected with PHY 454 of UE 450. PHY 421 is connected with PHY 464 of UE 450. PHY 431 is connected with PHY 467 of UE 450. The CP connectivity includes the protocol stack of microwave base station 410 and UE protocol stack of PHY 454, MAC 453, RLC 452, and PDCP 451. The UP connectivity is configured with multiple connectivities with UP anchor station 420 and UP assistance station 430.

Figure 5:
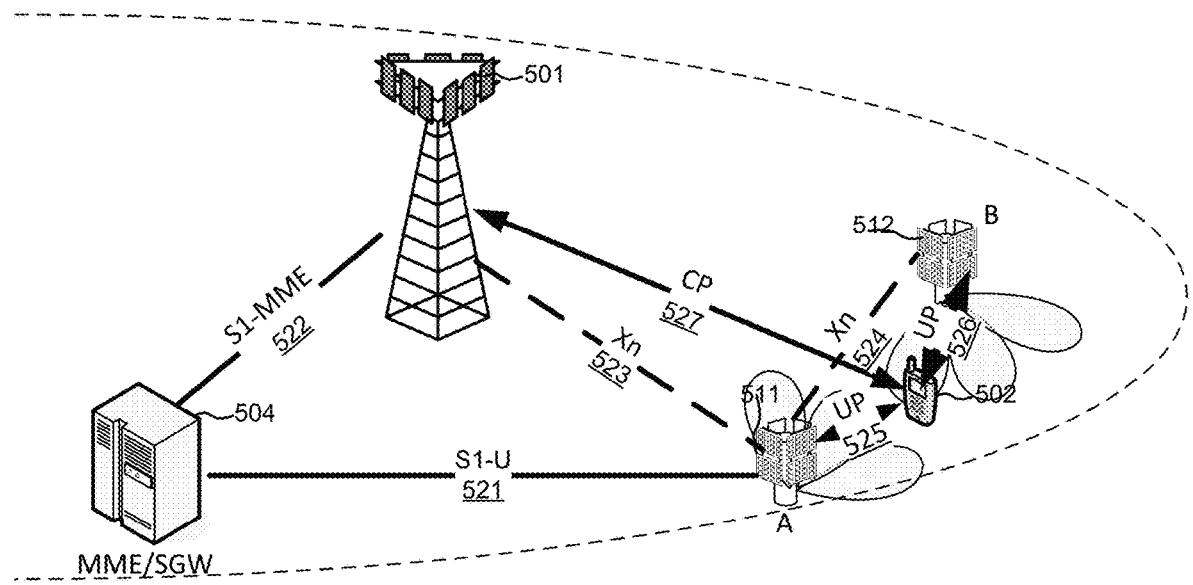
FIG. 5 illustrates an exemplary MMW wireless system with multiple-connectivity configured through hierarchy UP architecture solution in accordance with the current invention.

FIG. 5 illustrates an exemplary MMW wireless system with multiple-connectivities configured through hierarchy UP architecture solution in accordance with the current invention. UE 502 establishes a RRC connection with the microwave macro cell 501, where the S1-MME interface 522 is terminated. The macro cell is mainly responsible for the Control-plane (CP) procedure operation, such as RRC connection control, security control, mobility control and NAS message transfer, etc. Multiple MMW base stations provide traffic data together with UE 502 and are connected with one interface, named as Xn, such as Xn 523 between macro base station 501 and MMW base station 511, and Xn 524 between MMW base station 511 and MMW base station 512. One of the MMW base stations, MMW base station 511, where S1-U interface is terminated, is named as an UP anchor MMW base station. It buffers the traffic data for the UE, for which multiple-connectivity is configured, and forwards the data to other MMW base stations. The UP anchor is a logical function entity. The UP anchor is for an EPS bearer. It is the central router for a group of MMW base stations and performs flow control towards the multiple MMW base station and data forwarding to multiple MMW base stations. Other MMW base stations, where S1-U is not terminated, are named as UP assistance MMW base stations. In FIG. 4, MMW base station A 511 is considered as an UP anchor MMW base station, while MMW base station B 512 is considered as an UP assistance MMW base station. UE 502 communicates with different MMW base stations through different directional transmission/reception. The MMW base stations may operate in the same or different frequencies. Two types of operations need to be considered if multiple MMW base stations are configured for one specific UE with multiple-connectivity. The type-1 operation has only one MMW base station (either UP anchor MMW base station or UP assistance base stations) can transmit/receive traffic data to/from the UE. The type-2 operation has more than one MMW base station (both UP anchor MMW base station and UP assistance base stations) can transmit/receive traffic data to/from the UE. UE 502 also connects with macro-cell base station 501 and forms CP connectivity 527. Macro-cell base station 501 connects with the network entity 504, such as the MME/SGW through S1-MME interface 522. Network entity 504 forms the UP connectivity with anchor MMW base station 511 through S1-U interface 521. The UP connectivity also includes connection 525 between MMW base station 511 and UE 502 and connection 526 between MMW base station 512 and UE 502.

Actually, the role of UP anchor MMW base station can be abstracted as one logical entity, which can be located anywhere in the network to realize at least the following functions:

1. It is where S1-U interface terminated;
2. It is responsible for data distribution to other MMW stations.
3. It is responsible for lossless data transmission when other MMW base station communicating with UE changes.

Figure 6:
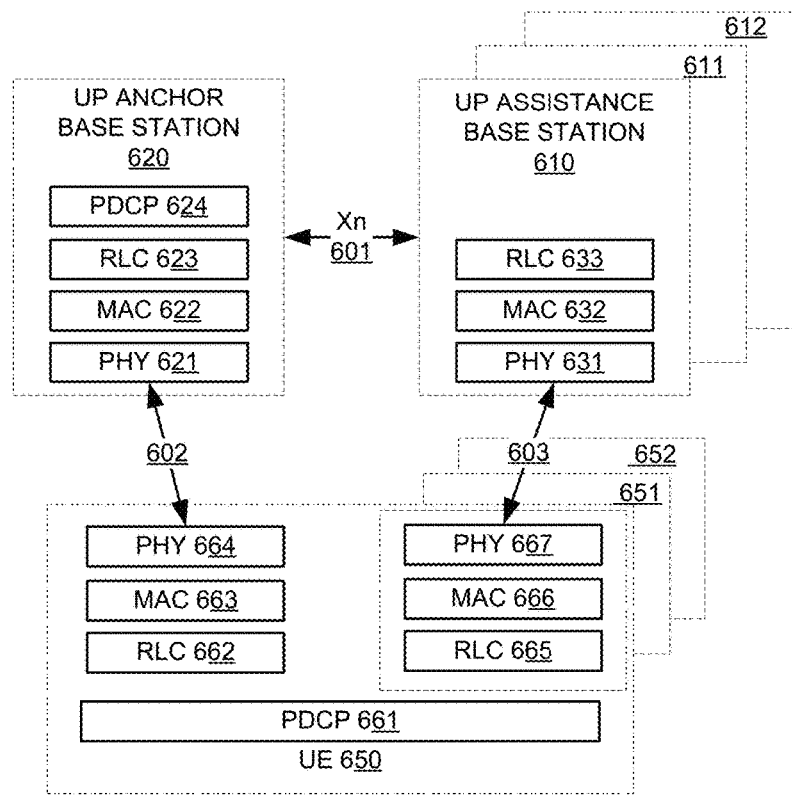
FIG. 6 shows exemplary block diagrams illustrating protocol stacks of the MMW wireless system when multiple-connectivity and with different protocol stack options in accordance with the current invention.

FIG. 6 shows exemplary block diagrams illustrating protocol stacks of the MMW wireless system when multiple-connectivity and with different protocol stack options in accordance with the current invention. UP anchor MMW base station 620 has a physical layer (PHY) 621, Mac layer (MAC) 622, Radio Link Control (RLC) 623, and Packet Data Control Protocol (PDCP) 624. UP assistance MMW base station 610 has a PHY 631, MAC 632 and RLC 633. The interface between UP anchor base station and UP assistance base station is the Xn interface 601. The peer protocol stacks terminated in UE 650 include PHY, MAC, RLC and PDCP. PHY 664, MAC 663, RLC 662 and PDCP 661 terminated in UE 650 are the peer protocol stacks of the ones terminated in UP anchor MMW base station 620. PHY 667, MAC 666, and RLC 665 terminated in UE 650 are the peer protocol stacks of the ones terminated in UP assistance MMW base station 610. The UE 650 and the UP anchor MMW base station 620 communicates by a Radio Link 602. The UE 650 and the UP assistance MMW base station 610 communicates by another Radio Link 603. FIG. 6 also illustrates different UP protocol stack options of UP anchor MMW base station, UP assistance MMW base station and UE in a generic way when multiple MMW base stations are configured. One of the configured MMW base stations is the UP anchor MMW base station, and other MMW base stations are UP assistance MMW base stations. The integration of multiple MMW base stations and data forwarding at different layers, i.e. PDCP, RLC and MAC respectively. In a more generic way, multiple MMW base stations can be configured for traffic data transmission/reception, with coordination and integration at different layers (PDCP, RLC or MAC). So for UE and UP assistance MMW base stations, there are corresponding protocol stacks at different cases, for example, when the traffic data transmission/reception is cocrdinated and integrated at PHY layer, there are corresponding PHY payers, the same for coordination and integration at different layers (PDCP, RLC or MAC). In FIG. 6, there may be multiple assistance MMW base station, for example assistance MMW base stations 610, 611 and 612, and there are corresponding protocol stacks in UE 650, for example protocol stacks 651 and 652, the number of assistance MMW base station is an example, not limitation.

Figure 7:
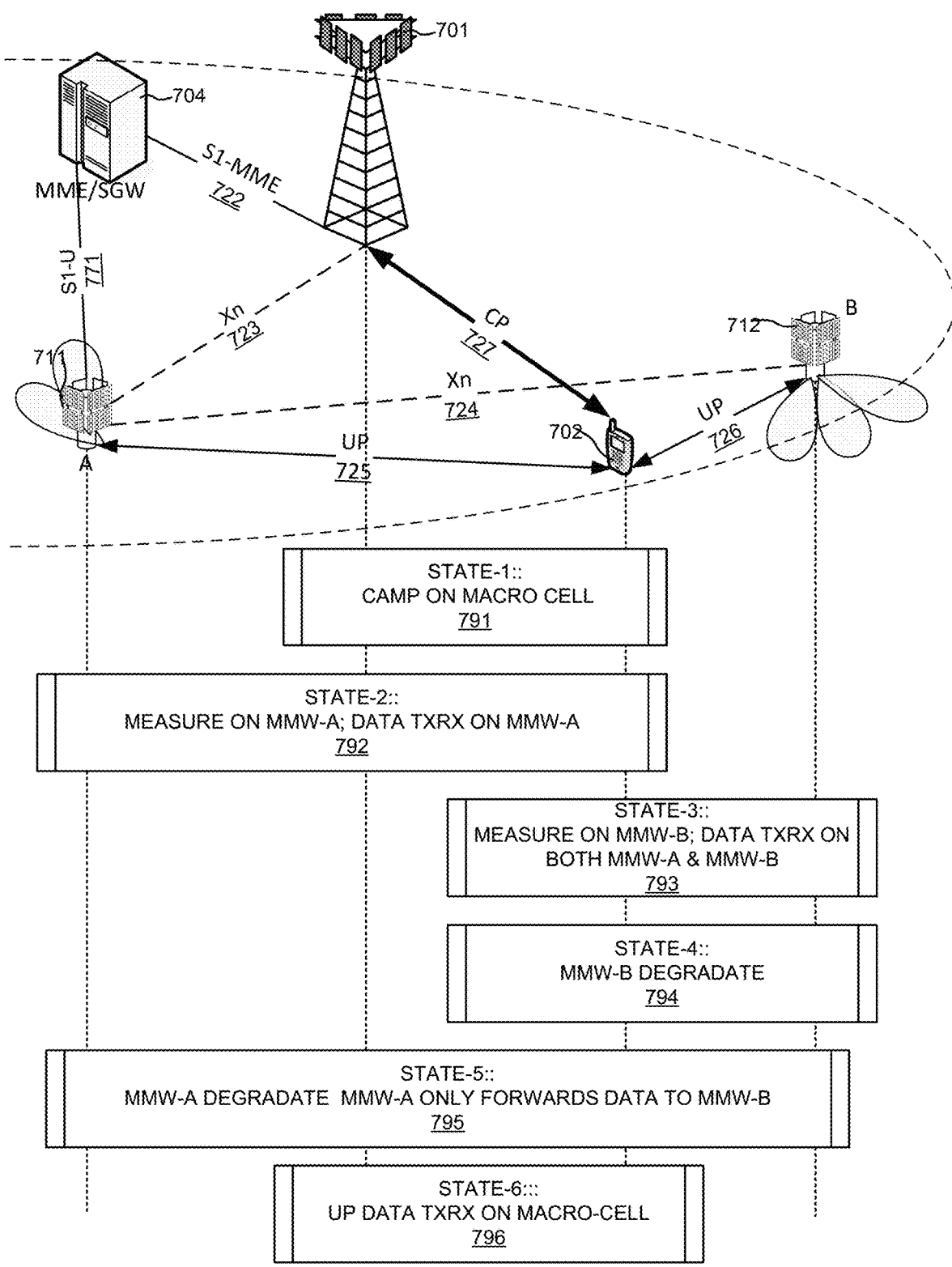
FIG. 7 illustrates an exemplary diagram of different state transition in accordance with embodiments of the current invention.

FIG. 7 illustrates an exemplary diagram of different state transition in accordance with embodiments of the current invention. Similar to FIG. 5, UE 702 is configured for CP connectivity 727 with macro-cell base station 701 and UP connectivity 725 with MMW base station A 711. There is Xn interface between macro-cell base station 701 and MMW base station A 711. At step 791 of state-1, UE 702 camps on the macro cell, which is covered by the macro base station 701, and establishes RRC connection with it. The CP functionalities and procedures as well as SRB transmission/reception (RRC message and NAS message) is performed towards the macro base station, where S1-MME 722 is terminated. At step 792 of state-2, a small base station, for example MMW base station (A) 711 is measured. If the radio quality of the MMW link between the UE 702 and the MMW base station A 711 is capable of performing data transmission/reception and UE 702 has upcoming services of large volume of data, dual connectivity is configured for the UE 701. The S1-U interface 771 between the MMW base station A 711 and the SGW 704 is established for UE 702 and the traffic packets are transmitted/received through the MMW base station A 711. At step 793 of state-3, another MMW base station (B) 712 is also measured. If the radio quality of the MMW link between the UE 702 and the MMW base station B 712 is capable of performing data transmission/reception and UE 702 has even larger volume of data, multiple-connectivity is configured for UE 702. MMW base station A 711 is the UP anchor MMW base station. It forwards the data specific for UE 702 to MMW base station B 712, which is the UP assistance MMW base station. Therefore, both MMW base station A 711 and B 712 can communicate with UE 702 in parallel. There could be Xn interface 724 between MMW base station A 711 and MMW base station B 712, and another UP connectivity between UE 702 and MMW base station B 712. At step 794 of state-4, the radio link quality of UP assistance MMW base station B 712 degrades and UP assistance MMW base station B 712 is not proper to perform data transmission/reception. Since the data transmission/reception through MMW base station B 712 is not reliable enough, the data transmission/reception with B 712 should stop. UP anchor MMW base station A 711 also stops data forwarding to the MMW base station B 712. However, data transmission/reception with MMW base station A 711 can be continued since the radio link with it is still reliable enough for communication. At step 795 of state-5, the radio link quality of UP anchor MMW base station A 711 degrades while the radio link quality of UP assistance MMW base station B 712 may become better, MMW base station A 711 stops data transmission/reception with UE 702 but forwards the data to MMW base station B 712. UE only performs the traffic data transmission with MMW base station B 712. Or the network can change the role of the MMW base station A and B, i.e. the MMW base station B 712 is changed to become the UP anchor MMW base station, and S1-U is changed to be terminated to it. The MMW base station A 711 is changed to be the UP assistance MMW base station. At step 796 of state-6, both the link quality of MMW station A 711 and B 712 degrade, and cannot perform data transmission/reception reliably. The multiple-connectivity can be released then. The traffic data transmission/reception can fall back to the macro layer, and path update procedure is performed to change S1-U to be terminated to the microwave base station. It should be noted that in all the states, connectivity with the microwave base station 701 is always kept. UE performs measurement on the MMW frequency to find the candidate MMW base stations for multiple-connectivity configuration.

Figure 8A:
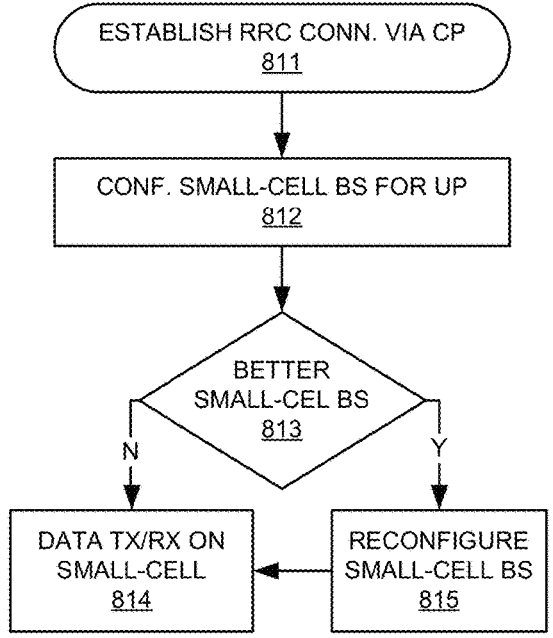
FIG. 8A shows an exemplary flow chart of the UE to configure multiple-connectivity and select UP anchor base station for a UE.

FIG. 8A shows an exemplary flow chart of the UE to configure multiple-connectivity and select UP anchor base station for a UE.

FIG. 8A shows an exemplary flow chart of the network to configure multiple-connectivity and select UP anchor small base station for a UE. In one embodiment with a more generic way, multiple small base stations, for example, multiple MMW base stations may be configured as the UP assistance MMW stations. At step 811, the RRC connection is established with a UE through the macro base station. At step 812, the network configures a set of small base stations, for example, a set of small base stations for traffic data transmission/reception for the UE. At step 813, the UE determines whether the small base stations with better link quality are found. If step 813 finds yes, at step 815, the network reconfigures the set of MMW base stations for the UE. For example, the worst N small base stations are replaced by the newly found N better small base stations. (N is the number of newly found small base stations with better link quality.) The UE then moves to step 814 where the traffic data transmission/receptions are performed with the UE through the configured set of small base stations. If step 813 finds no, the UE moves to step 814 where the traffic data transmission/receptions are performed with the UE through the configured set of small base stations.

Figure 8B:
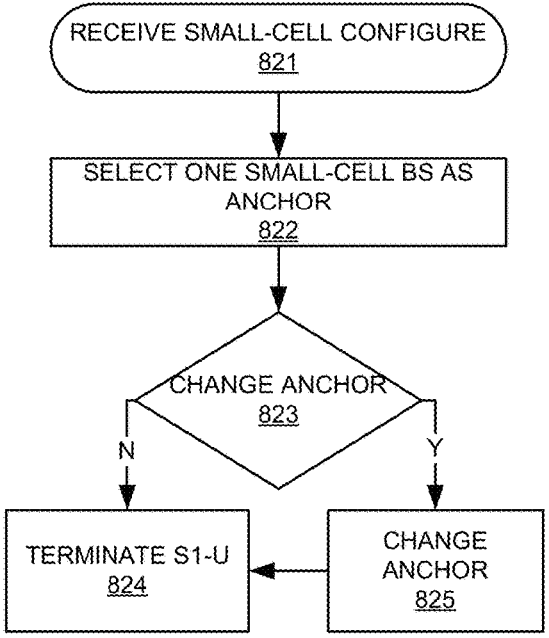
FIG. 8B shows an exemplary flow chart of the network to configure multiple-connectivity and select UP anchor base station for a UE.

FIG. 8B shows an exemplary flow chart of the network to configure multiple-connectivity and select UP anchor small base station for a UE. At step 821 a set of small base stations, for example a set of MMW base stations are configured for the UE. At step 822, one small base station is selected as the UP anchor small base station. In the case of MMW system, the UP anchor small base station could be a UP anchor MMW base station. At step 823, the UE determines if the anchor small base station needs to be changed. If step 823 determines yes, the UP anchor small base station needs to be changed due to load balance, link quality variation or UE mobility, another small base station will be configured as the UP anchor at step 825. So path update procedure will be performed to relocate the S1-U interface to the new UP anchor MMW base station. In a generic way, the set of small base stations for multiple-connectivity can have one or multiple small base stations. If there is only one MMW base station, it is the UP anchor small base station. If step 823 determines no, the UE moves step 824 and terminates the S1-U interface.

Certain criteria can be defined for UP anchor small base station selection, which includes but not limits to the following criteria: the first small base station configured for traffic data transmission/reception; the small base station has the lightest traffic load; the small base station has the best link quality; the small base station has least number of backhaul hops to the core network. In the case of MMW system, the certain criteria can be defined for UP anchor MMW base station selection, which includes but not limits to the following criteria: the first MMW base station configured for traffic data transmission/reception; the MMW base station has the lightest traffic load; the MMW base station has the best link quality; the MMW base station has least number of backhaul hops to the core network. The multiple-connectivity can be configured in two different ways, i.e. network-centric and UE-centric.

Figure 9:
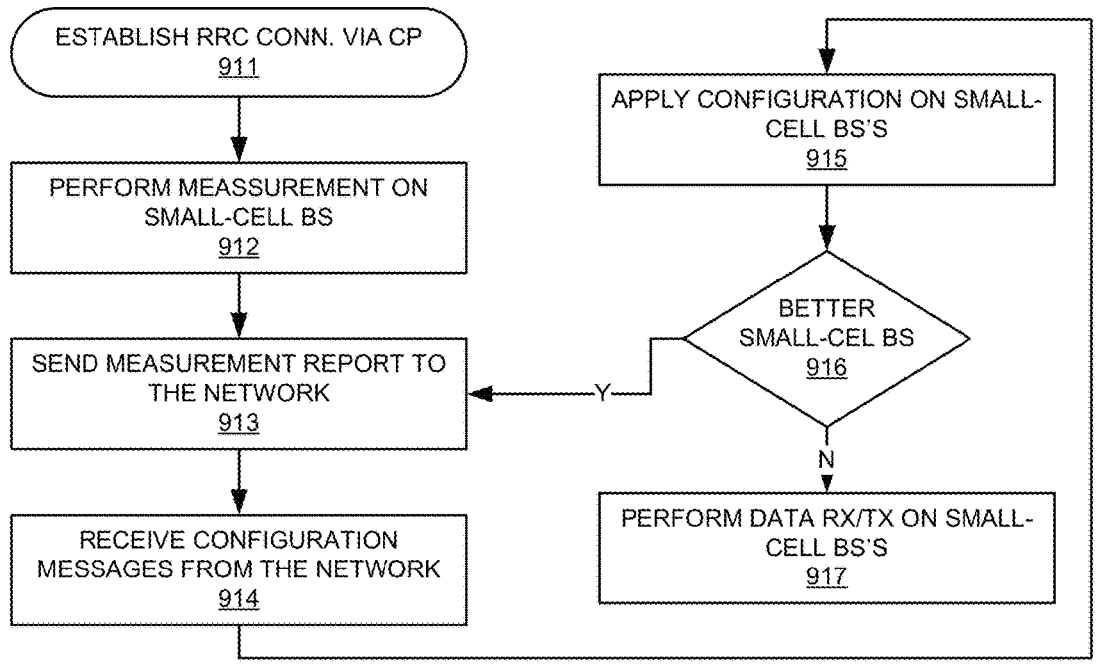
FIG. 9 shows an exemplary flow chart of the UE to apply the configuration of multiple-connectivity in network-centric way.

FIG. 9 shows an exemplary flow chart of the UE to apply the configuration of multiple-connectivity in network-centric way. At step 911, UE establishes a RRC connection with a macro base station. At step 912, the UE performs measurement on the small base station frequency, for example, the MMW frequency and sends the measurement report to the network, i.e. through the microwave base station. Based on the measurement report, the network may configure multiple-connectivity with a list of small base stations, for example, MMW base stations for the UE and select one of the MMW base stations as the UP anchor. At step 913, the network sends the configuration message to the UE. At step 914, the UE receives the configuration message. At step 915, upon reception of the configuration message, UE applies the multiple-connectivity configuration with one of the small base station (e.g. MMW base station) treated as UP anchor. UE begins traffic data transmission/reception with the configured small base stations (e.g. MMW base stations). Meanwhile, UE continues measurement on the neighboring MMW cells. At step 916, the UE determines whether small cells (e.g. MMW cells) with better link quality are found. If step 916 determines yes, the UE sends measurement report to the network for those small cells. So the network may reconfigure the set of small base stations for multiple-connectivity for the UE. Furthermore, if the network wants to change the UP anchor small base station, it can also inform UE the change through the configuration message. In the network-centric way, UE provides the measurement reports to the network, and the network decides the set of small base stations for multiple-connectivity and informs UE the decision through the configuration message. If step 916 determines no, the UE performs data transmission and receptions on the currently configured small-cell base stations.

Figures 10A, 10B:
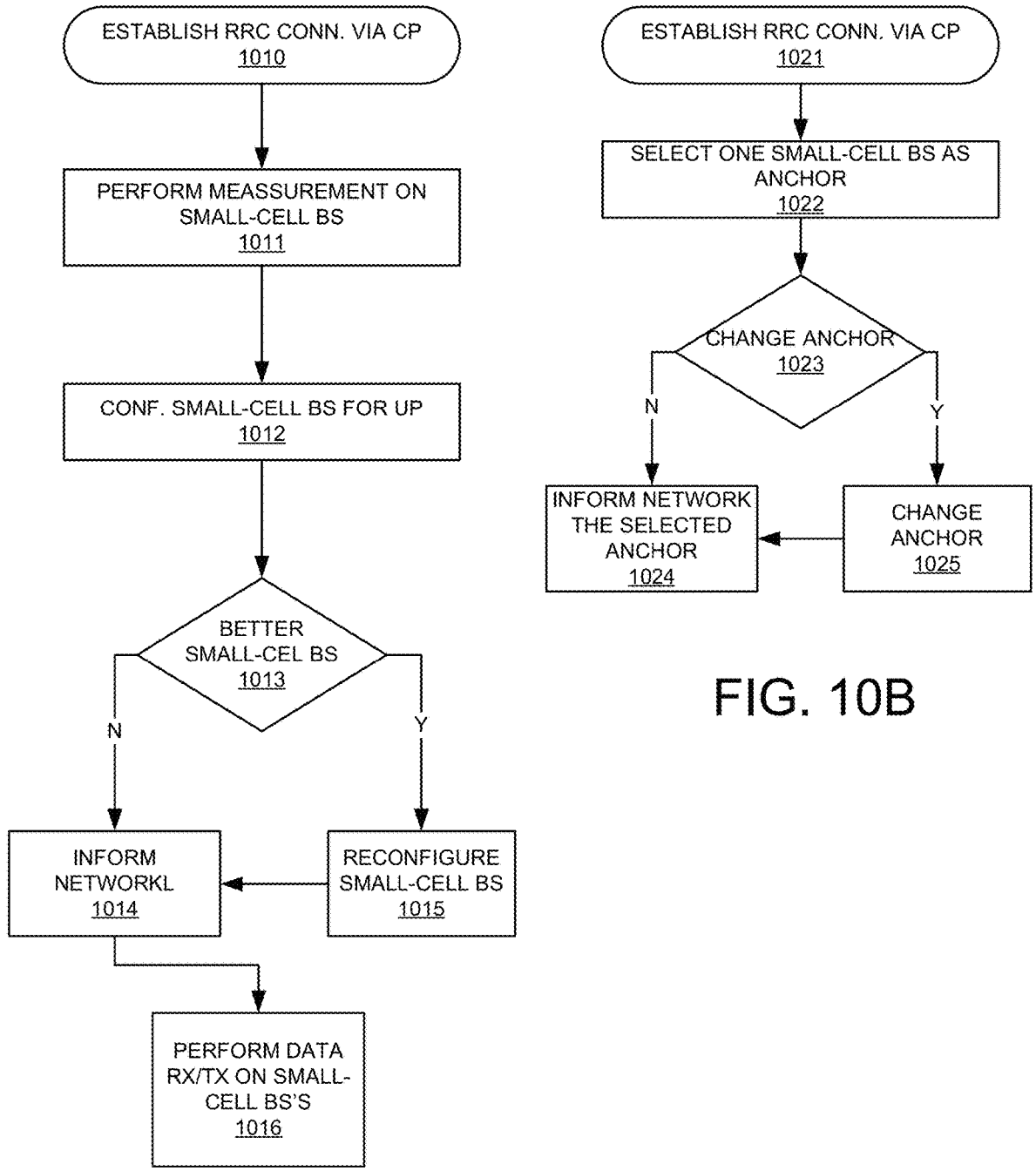
FIG. 10A shows exemplary flow charts of the UE to manage the multiple-connectivity in UE-centric way in accordance with the embodiments of the current invention.
FIG. 10B shows exemplary flow charts of the UE to manage the multiple-connectivity in UE-centric way in accordance with the embodiments of the current invention.

FIG. 10A shows exemplary flow charts of the UE to manage the multiple-connectivity in UE-centric way in accordance with the embodiments of the current invention. At step 1010, UE establishes RRC connection with a macro base station. At step 1011, UE performs measurement on the small base station frequency, e.g. MMW frequency. Based on the measurement results, at step 1012, the UE configures a set of small base stations (e.g. MMW base stations), selects UP anchor small base stations (e.g. MMW base station) for multiple-connectivity, and informs the network of the configuration. The network applies the configuration from the UE side and begins the traffic data transmission/reception with the set of small base stations (e.g. MMW base stations). At step 1013, the UE determines if small cells (e.g. MMW cells) with better link quality are found. If step 1013 determines yes, the UE moves to step 1015 and reconfigures the set of small base stations (e.g. MMW base stations), informs the network of the new configuration. If step 1013 determines no, the UE moves to step 1014 and informs the configuration to the network. At step 1016, the UE performs data transmission/reception with the set of small base stations (e.g. MMW base station).

FIG. 10B shows exemplary flow charts of the UE to manage the multiple-connectivity in UE-centric way in accordance with the embodiments of the current invention. When the UE are configured a set of small base stations (e.g. MMW base station), the eNB could select one small base station (e.g. MMW base station) as the UP anchor base station. And then if UE wants to change the UP anchor small base station, it can also inform the network the change through the configuration message, or else inform the selection of the UP anchor base station to the network. In the UE-centric way, UE doesn't provides the measurement reports to the network, but decides the set of small base stations for multiple-connectivity itself and informs the network the decision through configuration message. The network can accept part of the configuration or reject the configuration. At step 1021, the UE establishes connection through the CP connectivity. At step 1022, the UE selects one small-cell base station as the anchor small base station. At step 1023, the UE determines whether the anchor small base station needs to be changed. If step 1023 determines yes, the UE moves to step 1022 and changes the anchor small base station. If step 1023 determines no, the UE moves to step 1024 and informs the network of the newly selected anchor small base station.

Figure 11:
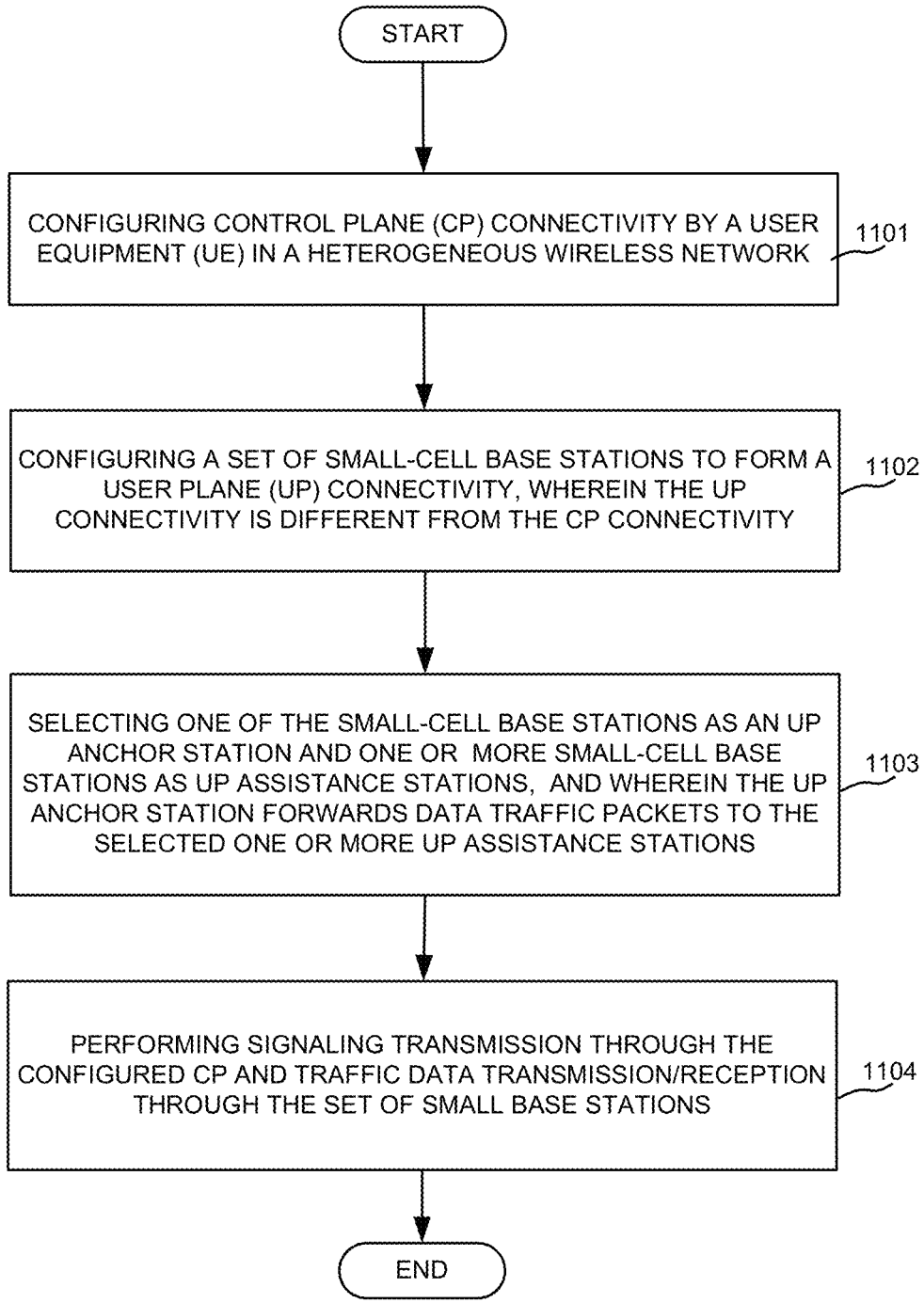
FIG. 11 illustrates an exemplary flow chart of the multiple connectivity for the heterogeneous network in accordance with embodiments of the current invention.

FIG. 11 illustrates an exemplary flow chart of the multiple connectivity for the heterogeneous network in accordance with embodiments of the current invention. At step 1101, the UE configures the CP connectivity in a heterogeneous wireless network. At step 1102, the UE configures a set of small-cell base stations to form a UP connectivity, wherein the role of UP anchor base station can be abstracted as one logical entity, which can be located anywhere in the network to realize at least the following functions: 1. It is where S1-U interface terminated; 2. It is responsible for data distribution to the assistance base stations. 3. It is responsible for lossless data transmission when assistance base stations communicating with UE changes. At step 1103, the UE selects one of the small-cell base stations as an UP anchor station and one or more small-cell base stations as UP assistance stations, wherein an S1-U interface from the wireless network is terminated at the selected UP anchor station, and wherein the UP anchor station forwards data traffic packets to the selected one or more UP assistance stations. At step 1104, the UE performs signaling transmission through the configured CP and traffic data transmission/reception through the set of small base stations.

Although the present invention has been described in connection with certain specific embodiments for instructional purposes, the present invention is not limited thereto. Accordingly, various modifications, adaptations, and combinations of various features of the described embodiments can be practiced without departing from the scope of the invention as set forth in the claims.

What is claimed is:

1. A method comprising:
   configuring control plane (CP) connectivity by a user equipment (UE) in a heterogeneous wireless network;
   configuring a set of small-cell base stations to form a user plane (UP) connectivity, wherein the UP connectivity is different from the CP connectivity;
   selecting one of the small-cell base stations as an UP anchor station and one or more small-cell base stations as UP assistance stations, wherein the UE communicates with the UP anchor station and at least one UP assistance station for data traffic packets, and wherein the UP anchor station forwards data traffic packets to the UP assistance stations;
   performing signaling transmission through the configured CP and traffic data transmission/reception through the UP anchor station and the UP assistance stations;
   establishing a radio link control (RRC) connection through the CP with a macro-cell base station; and
   performing measurements on the set of UP small-cell base stations.

2. The method of claim 1, wherein the CP connectivity is connected to the macro-cell base station, wherein an S1-U interface from the wireless network is terminated at the UP anchor station, and wherein CP procedures of the UE are performed on the macro-cell through the macro-cell base station.

3. The method of claim 1, wherein the set of small-cell base stations are millimeter wave (mmW) base stations.

4. The method of claim 1, wherein the UP connectivity is formed by integrating the set of small-cell base stations at different protocol layers.

5. The method of claim 4, wherein the UP connectivity is formed by integrating the set of small-cell base stations at a packet data convergence protocol (PDCP) layer, a radio link control (RLC) layer, or a MAC layer.

6. The method of claim 1, further comprising:
   sending measurement reports of the small-cell base stations through the CP to the wireless network upon detecting one or more triggering events;
   receiving one or more UP configuration messages from the wireless network; and
   applying the received UP configuration to the set of small-cell base stations.

7. The method of claim 6, wherein the UP configuration message from the wireless network indicates a change of the UP anchor station.

8. The method of claim 6, where the triggering event is detecting one or more small-cell base stations with better signal quality than the UP anchor station.

9. The method of claim 1, further comprising:
   detecting one or more small-cell base stations with better signal quality than the UP anchor station;
   selecting a new anchor UP station based on the measurements; and
   informing the wireless network regarding the new anchor UP station.

10. A user equipment (UE), comprising:
    one or more first radio frequency (RF) transceivers that transmit and receive radio signals of small-cell signals in a heterogeneous wireless network;
    a second RF transceiver that transmits and receives radio signals of macro-cell signals in the heterogeneous wireless network;
    a memory; and
    a processor coupled to the memory, the processor configured to configure a CP connectivity;
    configure a set of small-cell base stations to form a UP connectivity, wherein the UE communicates with the UP anchor station and at least one UP assistance station for data traffic packets, and wherein the UP connectivity is different from the CP connectivity;
    select one of the small-cell base stations as an UP anchor station and one or more small-cell base stations as UP assistance stations, and wherein the UP anchor station forwards data traffic packets to the UP assistance stations;
    perform signaling transmission through the configured CP and traffic data transmission/reception through the UP anchor station and the UP assistance stations;
    establish a radio link control (RRC) connection through the CP with a macro-cell base station; and
    perform measurements on the set of UP small-cell base stations.

11. The UE of claim 10, wherein an S1-U interface from the wireless network is terminated at the UP anchor station, the CP connectivity is connected to the macro-cell base station, and wherein CP procedures of the UE are performed on the macro-cell through the macro-cell base station.

12. The UE of claim 10, wherein the set of small-cell base stations are millimeter wave (mmW) base stations.

13. The UE of claim 10, wherein the UP connectivity is formed by integrating the set of small-cell base stations at different protocol layers.

14. The UE of claim 13, wherein the UP connectivity is formed by integrating the set of small-cell base stations at a packet data convergence protocol (PDCP) layer, a radio link control (RLC) layer, or a MAC layer.

15. The UE of claim 10, wherein the processor is further configured to
- detect one or more small-cell base stations with better signal quality than the UP anchor station;
- select a new anchor UP station based on the measurements; and
- inform the wireless network regarding the new anchor UP station.

16. The UE of claim 10, wherein the processor is further configured to send measurement reports of the small-cell base stations through the CP to the wireless network upon detecting one or more triggering events; and receive one or more UP configuration messages from the wireless network, wherein the UP configurator applies the received UP configuration to the set of small-cell base stations.

17. The UE of claim 16, wherein the UP configuration message from the wireless network indicates a change of the UP anchor station.

18. The UE of claim 16, where the triggering event is detecting one or more small-cell base stations with better signal quality than the UP anchor station.

* * * * *